United States Patent Office 3,629,428
Patented Dec. 21, 1971

3,629,428
PESTICIDE FOR CONTROLLING BACTERIAL AND FUNGAL DISEASES OF RICE PLANT
Shigeo Seki and Yasuharu Sekizawa, Tokyo, Ken Nishibata, Yokosuka-shi, Tetsuro Watanabe and Takahiko Kikuchi, Yokohama-shi, and Hiroshi Igarashi, Chigasaki-shi, Japan, assignors to Meiji Seika Kaisha, Ltd., Tokyo, Japan
No Drawing. Filed Aug. 20, 1968, Ser. No. 753,872
Claims priority, application Japan, Sept. 7, 1967, 42/57,059, 42/57,060; Dec. 16, 1967, 42/80,272, 42/80,273
Int. Cl. A01n 9/12
U.S. Cl. 424—270          6 Claims

ABSTRACT OF THE DISCLOSURE

A method for controlling bacterial and fungal diseases of rice plants by applying 3-alkoxy-, 3-alkenyloxy- or 3-alkynloxy-1,2-benzisothiazole-1,1-dioxides to the rice plant.

---

This invention relates to a pesticide for controlling bacterial and fungal diseases of rice plant which comprises 3-alkoxy-, 3-alkenyloxy- or 3-alkynyloxy-1,2-benzisothiazole-1,1-dioxides as the active ingredient, to a method of controlling bacterial and fungal diseases of rice plant by using such a pesticide, and to new and useful 3-alkenyloxy- and 3-alkynyloxy - 1,2-benzisothiazole-1,1-dioxides and the production thereof.

Hitheretofore, many organic mercury compounds have widely been used in many countries as a fungicide which is effective in practice to control the rice blast, but recently it has been found that the use of organic mercury compounds in paddy field of rice plant would involve accumulation of harmful amounts of mercury in the body of human beings who live on rice. In these circumstances, there occurs increasing demand to use any other and much harmless fungicide for controlling the fungal diseases of rice plant. It has recently been proposed to use pentachlorophenol derivatives in place of the organic mercury compounds. However, the pentachlorophenol derivatives also suffer from their high toxicity. Fungicides of the antibiotic-type such as streptomycin and cellocidin have also been propoesd and employed in practice but suffer from a drawback of poor protection effect in spite of their higher eradicant effect to control rice leaf blight disease. Other antibiotic types of fungicide, namely blasticidin S and kasugamycin are are mainly of eradicant action without any particular protective action, because of either their poor stabilities or lacking spore-cidal action.

We, the inventors, have made search for such pesticides which are usefully effective to control the bacterial and fungal diseases of rice plants, such as rice blast (*Piricularia oryzae*), bacterial leaf blight (*Xanthomonas oryzae*) and sheath blight (*Coriticium sasaki*) but have neither any phyto-toxicity to rice plant nor objectionable toxicity to men, beasts and fishes.

We have now found that 3-alkoxy-, 3-alkenyloxy- and 3-alknyloxy-1,2-benzisothiazole-1,1-dioxides of the following general formula:

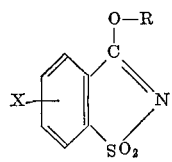

wherein R is an alkyl group such as methyl, ethyl, n-propyl, n-butyl, n-pentyl, iso-pentyl, n-hexyl, n-heptyl and n-undecyl; an alkenyl group such as allyl, 1-ethynyl-allyl, an alkynyl group such as 2-propynyl, 1-ethyl-2-propynyl, 1-n-pentyl-2-propynyl, 3-iodo-2-propynyl, 3-bromo-2-propynyl and 2-pentene-4-ynyl; and X is a hydrogen atom, a chlorine atom or nitro group having usefully high pesticidal activity against *Piricularia oryzae*, *Coriticium sasaki* and *Xanthomonas oryzae* but have neither (or little) phyto-toxicity to the rice plant nor objectionable toxicity to men, beasts, fishes and water-flea.

According to the present invention, therefore, we provide a pesticide for controlling bacterial and fungal diseases of rice plant, which comprises as the active ingredient a 3-substituted-1,2-benzisothiazole-1,1-dioxide of the general formula

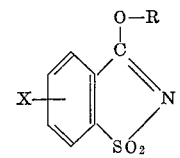

wherein R is selected from the group consisting of alkyl, allyl, 1-ethynyl-allyl, 2-propynyl, 1-ethyl-2-propynyl, 1-n-pentyl-1-propynyl, 3-iodo-2-propynyl, 3 - bromo-2-propynyl and 2-pentene-4-ynyl; and X is selected from the group consisting of hydrogen, chlorine and nitro.

According to a further aspect of the present invention, there is provided a method for controlling bacterial and fungal diseases of rice plant which comprises applying to at least a part of rice plant an effective amount of a 3-substituted-1,2-benzisothiazole-1,1-dioxide of the general formula:

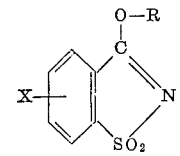

wherein R is selected from the group consisting of alkyl, allyl, 1-ethynyl-allyl, 2-propynyl, 1-ethyl-2-propynyl, 1-n-pentyl - 1 - propynyl, 3 - iodo-2-propynyl, 3-bromo-2-propynyl and 2-pentene-4-ynyl; and X is selected from the group consisting of hydrogen, chlorine and nitro.

Among the compounds which are represented by the above-mentioned general formula, the 3-alkoxy-1,2-benzisothiazole-1,1-dioxides are disclosed in the "Journal of American Chemical Society" vol. 65, pages 457–458 (1943) whereas those compounds in which R stands for allyl, 1-ethynyl-allyl, 2-propynyl, 3-substituted-2-propynyl and 2-pentene-4-ynyl are all new compounds.

Accordingly, we provide as new compound 3-alkenyloxy- and 3-alkynyloxy-1,2-benzisothiazole-1,1-dioxides of the general formula:

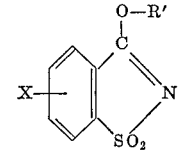

wherein R' is selected from the group consisting of allyl, 1-ethynyl-allyl, 2-propynyl, 1-ethyl-2-propynyl, 1-n-pentyl-propynyl, 3-iodo-2-propynyl, 3-bromo-2-propynyl and 2-pentene-4-ynyl; and X is selected from the group consisting of hydrogen, chlorine and nitro.

When the pesticide according to the present invention is used, it may be applied directly to paddy field of rice plant but may also be applied in admixture with an appropriate carrier or diluent. The carrier or diluent may be either liquid or solid which is chemically inert to the active ingredient compound. Suitable examples of the solid diluent include clay, kaolin, talc, diatomaceous earth, silica, vermiculite, calcium carbonate, sodium hydrogen carbonate and the like. Liquid diluents may be solvents which can dissolve the active ingredient compound, or may be other liquids in which the active ingredient compound may be dispersed or dissolved with aid of any surface active agent. Suitable examples of liquid diluents which may be used include water, benzene, kerosene, alcohols, dioxane, acetone, animal oil, vegetable oil and the like. In order to insure that effective application of the pesticide of the present invention can be achieved, it is preferred to apply the pesticide in combination with spreading agent, wetting agent, sticking agent and/or emulsifying agent etc. The proportion of the active ingredient compound to the diluent and additive mixed may vary over a wide range. When the pesticide of the present invention is to be applied in the form of a solution, the concentration of the active ingredient compound therein may suitably be 50 to 1000 p.p.m. When the pesticide of the present invention is to be applied in the form of a dust or wettable powder, it is desirable that the solid preparations contain the active ingredient compound at a concentration of 0.5 to 10% by weight. Of course, it is also possible to apply the pesticide of the present invention in admixture with other known fungicides, insecticides, herbicides and/or plant-growth regulators, if desired.

The 3-alkoxy-, 3-alkenyloxy- and 3-alkynyloxy-1,2-benzisothiazole-1,1-dioxides which are used as the active ingredient for the pesticide of the present invention may be prepared by reacting 3-chloro- or 3-bromo-1,2-benzisothiazole-1,1-dioxides with an alcohol of the general formula R—OH in which R has the same meaning as mentioned hereinbefore. The reaction may be carried out either by heating the reactants together, or by heating the solution containing the reactants dissolved in an appropriate solvent such as acetone, benzene, toluene and dioxane and preferably in the presence of an acid-binding agent such as potassium carbonate and triethyl amine, etc. It is preferred to react a 3-chloro- or 3-bromo-1,2-benzisothiazole-1,1-dioxide with a solution of an alcohol of the above-mentioned formula R—OH in pyridine at room temperature or with ice-cooling. The preparation of 3-alkoxy-1,2-benzisothiazole-1,1-dioxides is described in the "Journal of American Chemical Society" vol. 65, pages 457–458 (1943).

The preparation of the 3-alkenyloxy- and 3-alkynyloxy-1,2-benzisothiazole-1,1-dioxides is now illustrated with reference to the following Examples 1 to 14.

EXAMPLE 1

To 10 g. of 3-chloro-1,2-benzisothiazole-1,1-dioxide was added 50 cc. of allyl alcohol, and the mixture was heated for 1 hour under reflux. The reaction mixture was then distilled under reduced pressure to remove the excess of allyl alcohol. The residue was added with toluene and dissolved therein by heating. The hot solution was treated with active carbon for decolorization. The active carbon was filtered out from the hot solution and the filtrate cooled to yield about 7 g. of 3-allyloxy-1,2-benzisothiazole-1,1-dioxide which was in the form of colorless columnar crystals of a melting point of 128 to 129° C.

EXAMPLE 2

To 50 cc. of toluene was added 10 g. of 3-chloro-1,2-benzisothiazole-1,1-dioxide, and 5 g. of allyl alcohol and 6 g. of tri-ethyl amine were added thereto. The mixture was heated on a boiling water bath for 30 minutes and then distilled under reduced pressure to remove the solvent. The residue was added with water and the insoluble material was filtered out, washed with water and then dried. Recrystallization from toluene gave about 7.5 g. of 3-allyloxy-1,2-benzisothiazole-1,1-dioxide.

EXAMPLE 3

10 g. of 3-chloro-1,2-benzisothiazole-1,1-dioxide was added in small portions to a solution of 5 g. of allyl alcohol in 50 cc. of pyridine under stirring. After the addition was complete, the stirring continued for a further hour. The liquid reaction mixture was poured in about 200 cc. of water and the insoluble material was filtered out, washed with water and dried. Recrystallization from toluene gave about 8.0 g. of 3-allyloxy-1,2-benzisothiazole-1,1-dioxide.

EXAMPLE 4

10 g. of 3,6-dichloro-1,2-benzisothiazole-1,1-dioxide was added to 50 cc. of allyl alcohol and the solution was heated for 1 hour under reflux. The reaction mixture was distilled under reduced pressure to remove the excess of allyl alcohol. The residue was added with toluene, heated and filtered. The filtrate was treated with active carbon for decolorization and then again filtered. The solution was distilled under reduced pressure to remove toluene. Recrystallization of the residue from ligroin gave about 9 g. of 3-allyloxy-6-chloro-1,2-benzisothiazole-1,1-dioxide in the form of colorless, columnar crystals of a melting point of 133 to 134° C.

EXAMPLE 5

A mixture of 10 g. of 3-chloro-6-nitro-1,2-benzisothiazole-1,1-dioxide with 50 cc. of allyl alcohol was heated for 1 hour under reflux. The reaction mixture was then distilled under reduced pressure to remove the excess of allyl alcohol. The residue was added with toluene and dissolved in the latter by heating. The hot solution was treated with active carbon for decolorization and then filtered while the solution was kept hot. Cooling of the filtrate gave about 7 g. of 3-allyloxy-6-nitro-1,2-benzisothiazole-1,1-dioxide in the form of pale yellow-colored columnar crystals of a melting point of 120.5 to 121.5° C.

EXAMPLE 6

A mixture of 20 g. of 2-pentene-4-yne-1-ol with 5.2 g. of 3-chloro-1,2-benzisothiazole-1,1-dioxide was heated for 3 hours on a boiling water bath, and the reaction mixture was then distilled under reduced pressure to remove the excess of the alcohol. The residue was added with benzene and dissolved in the latter by heating. The solution was washed with an aqueous solution of sodium bicarbonate and then with water, and the solution was subsequently dried over anhydrous sodium sulfate and then concentrated by evaporation to deposit the crystals. Recrystallization from benzene gave about 4.5 g. of 3-(2-pentene-4-ynyloxy)-1,2-benzisothiazole-1,1-dioxide in the form of crystals having a melting point of 160 to 160.5° C.

EXAMPLE 7

5.2 g. of 3-chloro-1,2-benzisothiazole-1,1-dioxide was added in small portions to a solution of 2.0 g. of 1-ethynyl-allyl alcohol in 20 cc. of pyridine under stirring and ice-cooling. After the addition was complete, the mixture was left to stand overnight with ice-cooling. The reaction mixture was distilled under reduced pressure to remove pyridine. 50 cc. of water was added to the residue and the material un-dissolved was filtered out, washed with water and dried. Recrystallization from ligroin gave about 4.5 g. of 3-(1-ethynyl-allyloxy)-1,2-benzisothiazole-1,1-dioxide which melted at 129 to 130° C.

EXAMPLE 8

5.0 g. of 3-chloro-6-nitro-1,2-benzisothiazole-1,1-dioxide was added in small portions to a solution of 2.0 g.

of 1-ethynyl-allyl alcohol in 20 cc. of pyridine with stirring and ice-cooling. After the addition was complete, the mixture was allowed to stand for 3 days in an ice-box. The reaction mixture was then distilled under reduced pressure to remove pyridine. 50 cc. of water was added to the residue, and the mixture was acidified by addition of hydrochloric acid and then extracted with ethyl ether. The ethereal extract was washed with an aqueous solution of sodium bicarbonate and then with water and subsequently dried over anhydrous sodium sulfate. The solution in ethyl ether was concentrated by evaporation and the crystals deposited. Recrystallization from ethyl ether gave about 0.8 g. of 3-(1-ethynyl-allyloxy)-6-nitro-1,2-benzisothiazole-1,1-dioxide which melted at 141 to 141.5° C.

EXAMPLE 9

4.4 g. of 3,6-dichloro-1,2-benzisothiazole-1,1-dioxide was added in small portions to a solution of 2.0 g. of 1-ethynyl-allyl alcohol in 20 cc. of pyridine with stirring and ice-cooling. After the addition was complete, the mixture was left to stand overnight with ice-cooling. The reaction mixture was then distilled under reduced pressure to evaporate pyridine. 50 cc. of water was added to the residue, and the mixture was acidified by addition of hydrochloric acid and then extracted with benzene. The benzene extract was washed with an aqueous solution of sodium bicarbonate and then with water and subsequently dried over anhydrous sodium sulfate. The solution was distilled to remove benzene. Recrystallization of the residue from ligroin gave about 1.5 g. of 3-(1-ethynyl-allyloxy)-6-chloro-1,2-benzisothiazole-1,1-dioxide in the form of crystals of a melting point of 129 to 130° C.

EXAMPLE 10

10 g. of 3 - chloro - 1,2 - benzisothiazole - 1,1 - dioxide was added to 50 cc. of propargyl alcohol (that is, 2-propyne-1-ol) and the mixture was heated for 1 hour on a boiling water bath. The reaction mixture was distilled under reduced pressure to remove the excess of propargyl alcohol. The residue was added to toluene and dissolved in the latter by heating. The hot solution was treated with active carbon for decolorization and then filtered in hot. Cooling of the filtrate gave about 7 g. of 3 - (2 - propynyloxy) - 1,2 - benzisothiazole - 1,1 - dioxide in the form of colorless, columnar crystals of a melting point of 152.5 to 153.5° C. Recrystallization raised the melting point to 157–158° C.

EXAMPLE 11

10 g. of 3 - chloro - 1,2 - benzisothiazole - 1,1 - dioxide was added in small portions to a solution of 4.6 g. of 1 - ethyl - 2 - propyne - 1 - ol in 50 cc. of pyridine with agitation and ice-cooling. The reaction was carried out at a temperature of 5 to 10° C. and the agitation was continued at the same temperature for a further hour after the addition was complete. The reaction temperature was then raised to 40 to 45° C. at which the agitation was conducted further for 30 minutes. The reaction mixture was poured into about 200 cc. of water and the material deposited was filtered out, washed with water and then dried. When this crude product was recrystallized a ligroin-toluene mixture, there was obtained about 7.3 g. of 3 - (1 - ethyl - 2 - propynyloxy) - 1,2 - benzisothiazole-1,1-dioxide in the form of colorless, columnar crystals of a melting point of 124 to 125° C.

EXAMPLE 12

The procedure of Example 11 was repeated but using 7.0 g. of 1 - n - pentyl - 2 - propyne 1 - ol in place of the 1-ethyl-2-propyne-1-ol. There was obtained about 6.2 g. of 3 - (1 - n - pentyl - 2 - propynyloxy) - 1,2-benzisothiazole-1,1-dioxide in the form of colorless, columnar crystals of a melting point of 91 to 92° C.

EXAMPLE 13

10 g. of 3 - chloro - 1,2 - benzisothiazole - 1,1 - dioxide was added to 10 g. of 3-iodo-2-propyne-1-ol, and the mixture was heated for 5 hours on a boiling water bath. The reaction mixture was then added with 100 cc. of water and the material which deposited was filtered out, washed with water and then dried. Recrystallization from toluene gave about 8.5 g. of 3 - (3 - iodo - 2 - propynyloxy) - 1,2 - benzisothiazole - 1,1 - dioxide which melted at 171 to 172° C.

EXAMPLE 14

7.4 g. of 3-bromo-2-propyne-1-ol was added to 50 cc. of toluene and the solution was added with 10 g. of 3 - bromo - 1,2 - benzisothiazole - 1,1 - dioxide. The mixture was then heated for 4 hours under reflux and subsequently concentrated by distillation of the toluene. When the solution was allowed to cool, the crystals deposited. Recrystallization from toluene gave about 9.8 g. of 3 - (3 - bromo - 2 - propynyloxy) - 1,2 - benzisothiazole-1,1-dioxide which melted at 159 to 160° C.

EXAMPLE 15

1.18 g. of 3,5 - dichloro - 1,2 - benzisothiazole - 1,1-dioxide and 0.5 cc. of allyl alcohol were added to 6 cc. of dioxane, and 5 cc. of pyridine was further added thereto with agitation. The mixture was stirred for a further hour and the reaction mixture was poured into 50 cc. of water. The solid which deposited was filtered out, washed with water and dried. Recrystallization from ligroin gave 0.9 g. of 3 - allyloxy - 5 - chloro - 1,2 - benzisothiazole-1,1-dioxide in the form of colorless, needle-like crystals which melted at 113 to 114° C.

Pesticidal activity of the 3 - substituted - 1,2 - benzisothiazole-1,1-dioxides according to the present invention is now demonstrated with reference to the following examples.

EXAMPLE 16

Each of the compounds as indicated in Table 1 hereinafter was dissolved in acetone or dimethyl sulfoxide to prepare a solution containing 1% by weight of the active compound. Each solution was further diluted by addition of water so as to prepare different spraying liquors which contain the active compounds at different concentrations as indicated in Table 1 hereinafter, respectively.

Rice plants were cultivated in a phytotrone where the environment had been so adjusted that the rice blast disease would be likely to attack the rice plants. When the rice plants so cultivated had grown to four true leaves, the diluted solution was sprayed onto the rice plants. Inoculation of the rice blast fungi (*Piricularia oryzae*) to the rice plants was made by spraying a suspension containing the spores of the fungi onto the rice plants. The inoculation was conducted 2 days before or on the same day as the day when the spraying liquor was applied. The suspension of the spores of the rice blast fungi was also applied onto the other group of rice plants which were left un-treated as the control. About 7 days after the inoculation the number of lesions of infection on leaf was counted.

Index to evaluate the effectiveness of the test compound for controlling the rice blast are then calculated according to the following equation: Index of the rice-blast-controlling effect in % =

$$\left(1 - \frac{\text{Average number of infection lesions on leaf of the treated rice plant}}{\text{Average number of infection lesions on leaf of the un-treated rice plant}}\right) \times 100$$

The tests were made in three replications. Phytotoxicity of the test compound to the rice plants was estimated by visual observation during testing, and no observation of phyto-toxicity is shown by the symbol (—) in Table 1. The results obtained are shown in Table 1 below.

TABLE 1

| Compound tested | Concentration of the active compound in the diluted solution applied (in p.p.m.) | Index in percent of the controlling effect | | | | | |
|---|---|---|---|---|---|---|---|
| | | Treatment 2 days before inoculation | | | Treatment on the same day as inoculation | | |
| | | Test No. 1 | Test No. 2 | Test No. 3 | Test No. 1 | Test No. 2 | Test No. 3 |
| 3-(methoxy)-1,2-benzisothiazole-1,1-dioxide | 200 | 87(−) | 71(−) | 93(−) | 88(−) | 83(−) | 99(−) |
| | 400 | 80(−) | 83(−) | 90(−) | 98(−) | 96(−) | 99(−) |
| 3-(ethoxy)-1,2-benzisothiazole-1,1-dioxide | 400 | 87 | | | 94 | | |
| 3-(n-propoxy)-1,2-benzisothiazole-1,1-dioxide | 400 | | | | 73(−) | | |
| 3-(n-butoxy)-1,2-benzisothiazole-1,1-dioxide | 400 | | | | 84 | | |
| 3-(n-pentoxy)-1,2-benzisothiazole-1,1-dioxide | 400 | 87 | | | 90 | | |
| 3-(n-hexyloxy)-1,2-benzisothiazole-1,1-dioxide | 400 | 90 | | | 98(−) | | |
| 3-(n-heptyloxy)-1,2-benzisothiazole-1,1-dioxide | 400 | | | | 72 | | |
| 3-(n-undecyloxy)-1,2-benzisothiazole-1,1-dioxide | 400 | | | | 62(−) | | |
| 3-(allyloxy)-1,2-benzisothiazole-1,1-dioxide | 200 | 92(−) | 85(−) | 94(−) | 92(−) | 99(−) | 91(−) |
| | 400 | 98(−) | 80(−) | 94(−) | 90(−) | 92(−) | 95(−) |
| 3-(3-iodo-2-propynyloxy)-1,2-benzisothiazole-1,1-dioxide | 200 | | | | 80(−) | | |
| | 400 | | | | 75(−) | | |
| 3-(3-bromo-2-propynyloxy)-1,2-benziosthiazole-1,1-dioxide | 400 | 58(−) | | | 88(−) | | |
| 3-(1-ethyl-2-propynyloxy)-1,2-benzisothiazole-1,1-dioxide | 400 | 83(−) | | | 96(−) | | |
| 3-(1-n-pentyl-2-propynyloxy)-1,2-benzisothiazole-1,1-dioxide | 400 | 87(−) | | | 100(−) | | |
| Untreated (control) | | | | | 0(−) | 0(−) | 0(−) |

EXAMPLE 17

Each of the compounds as indicated in Table 2 hereinafter was dissolved in acetone to prepare a solution containing 1% by weight of the active compound. Each solution was further diluted by addition of water so as to prepare different spraying liquors which contain the active compounds at different concentrations as indicated in Table 2 hereinafter, respectively.

Rice plants were cultivated in a phytotrone where the environment had been so adjusted that the rice plants would be likely to be attacked with the rice blast. When the rice plants so cultivated had grown to four true leaves, the spraying liquor was sprayed onto the rice plants. After the spraying liquor on the leaf had been dried in air, inoculation was made by spraying a suspension containing the spores of the rice blast fungi (*Piricularia oryzae*) on the rice plants. The suspension of the spores of the rice blast fungi was also sprayed onto the other group of rice plants which were left untreated as the control. About 7 days after the inoculation, the number of lesions of infection on leaf was counted.

The tests were made in three replications. The index to evaluate the effectiveness of the test compound for controlling the rice blast as well as the phyto-toxicity of the test compound against the rice plant were estimated in the same manner as in Example 16. The results obtained are shown in Table 2 below.

TABLE 2

| Compound tested | Concentration of the active compound in the spraying liquor (in p.p.m.) | Index in percent of the controlling effect | | |
|---|---|---|---|---|
| | | Test No. 1 | Test No. 2 | Test No. 3 |
| 3-(1-ethynyl-allyloxy)-1,2-benzisothiazole-1,1-dioxide | 400 | 100(−) | 99(−) | |
| | 200 | 99(−) | 95(−) | 87(−) |
| 3-(2-pentene-4-ynyloxy)-1,2-benzisothiazole-1,1-dioxide | 400 | 84(−) | | |
| 3-(isopentyloxy)-1,2-benzisothiazole-1,1-dioxide | 400 | 93(−) | | |
| 3-allyloxy-6-chloro-1,2-benzisothiazole-1,1-dioxide | 400 | 98(−) | 96(−) | |
| | 200 | | 87(−) | 85(−) |
| 3-allyloxy-6-nitro-1,2-benzisothiazole-1,1-dioxide | 400 | 98(−) | 88(−) | |
| | 200 | 95(−) | 71(−) | 78(−) |
| 3-(1-ethynyl-allyloxy)-6-chloro-1,2-benzisothiazole-1,1-dioxide | 400 | 95(−) | | |
| 3-(1-ethynyl-allyloxy)-6-nitro-1,2-benzisothiazole-1,1-dioxide | 400 | 85(−) | | |
| Untreated (control) | | 0(−) | 0(−) | 0(−) |

All the compounds tested in this example were found to have a very low toxicity to mice when determined by oral administration. In addition, all the compounds tested in this example have practically no toxicity to carp and do not kill water-flea, so that they may be applied to the paddy field of rice plant with reliable safety.

EXAMPLE 18

3-(2-propynyloxy)-1,2-benzisothiazole-1,1-dioxide was dissolved in dioxane to prepare a solution of 1% by weight of this active compound. The solution was then diluted by addition of water so as to prepare spraying liquors which contain the active compound at different concentrations as indicated in Table 3 hereinafter, respectively.

Rice plants were cultivated in a phytotrone where the environment was so adjusted that the rice plants would be likely to be attacked with the rice blast. When the rice plants so cultivated had grown to five true leaves, the plants were treated by spraying the liquor thereonto. After the spraying liquor on the leaf had been dried in air, inoculation was made by spraying a suspension containing the spores of the rice blast fungi (*Picicularia oryzae*) onto the rice plants. About 7 days after the inoculation, namely when the control rice plants which were left untreated with the active compounds had shown a full sign of infection of the rice blast, the number of lesions of infection was counted. The tests weer made in three replications.

Index to evaluate the effectiveness of the test compounds for controlling the rice blast as well as the phyto-toxicity of the test compounds to the rice plant were estimated in the same manner as in Example 16. The results obtained are shown in Table 3 below.

TABLE 3

| Concentration of the active compound in the spraying liquor (in p.p.m.) | Index in percent of the controlling effect | | | | |
|---|---|---|---|---|---|
| | Test No. 1 | Test No. 2 | Test No. 3 | Test No. 4 | Test No. 5 |
| 100 | | 94(−) | | 93(−) | 95(−) |
| 200 | | 100(−) | 97(−) | 98(−) | 99(−) |
| 400 | | 98(−) | 100(−) | 98(−) | 98(−) |
| 800 | 98(−) | 99(−) | | | |
| Untreated (control) | 0 | 0 | 0 | 0 | 0 |

From the results of Table 3 it is clear that 3-(2-propynyloxy)-1,2-benzisothiazole-1,1-dioxide may be applied to rice plants in the form of preparations containing the active compound at a relatively high concentration without exhibiting any phyto-toxicity to the rice plant. This compound has a $LD_{50}$ of about 175 mg./kg. in intravenous injection to mice and a very low toxicity to mice in oral administration. Furthermore, this compound is found to have practically no toxicity to carp, so that it may be applied to the paddy field of rice plant with safety.

EXAMPLE 19

Rice plants were cultivated in a phytotrone where the environment was so adjusted that the rice plants would be likely to be attacked with bacterial leaf blight disease (*Xanthomonas oryzae*). When the rice plants so cultivated had grown to six true leaves, inoculation was made by applying the bacteria of bacterial leaf blight (*Xanthomonas oryzae*) to the leaves of the plants by means of a single needle. One day after the inoculation, the rice plants was treated by spraying with the spraying liquors containing 3-(2-propynyloxy)-1,2-benzisothiazole-1,1-dioxide as prepared in Example 18. About 14 days after the inoculation, namely when the control group of rice plants which was left un-treated with the active compound had exhibited a full sign of infection, the average length of the lesions of infection was determined. The tests were made in three replications. Index to evaluate the effectiveness of the test compound for controlling the bacterial leaf blight are calculated in a similar way to Example 16. The results obtained are shown in Table 4 below.

TABLE 4

| Concentration of the active compound in the spraying liquor (in p.p.m.) | Index in percent of the bacterial leaf blight-controlling effect | | |
|---|---|---|---|
| | Test No. 1 | Test No. 2 | Test No. 3 |
| 200 | 54 | 50 | 57 |
| 400 | 69 | 70 | 62 |
| Untreated (control) | 0 | 0 | 0 |

From the results of Table 4 it is seen that the compound tested in this example has a satisfactory eradicant effect for the bacterial leaf blight of rice plant.

EXAMPLE 20

Rice plants were pot-cultivated in a phytotrone where the environment was so adjusted that the rice plants would be likely to be attacked with sheath blight disease. When the rice plants so cultivated had grown to a height of about 50 cm., they were treated by spraying with the liquor containing 3-(2-propynyloxy)-1,2-benzisothiazole-1,1-dioxide at different concentrations as prepared in Example 18. After the liquor sprayed on leaf had been dried in air, inoculation was made by placing 2 g. of a bran culture of sheath blight fungi (*Coriticium sasaki*) per pot at the base of the rice plants, while the over-ground part of the plants was kept humid by winding around with wet filter paper. When the rice plants had exhibited a full sign of infection, the number of lesions of infection was counted. The tests were made in three replications. Index to evaluate the effectiveness of the test compound for protection against the sheath blight are calculated in a similar manner to Example 16, and the results of test obtained are shown in Table 5 below.

TABLE 5

| Concentration of the active compound in the spraying liquor (in p.p.m.) | Index in percent of the protection effect to the sheath blight | | |
|---|---|---|---|
| | Test No. 1 | Test No. 2 | Test No. 3 |
| 200 | 49 | 45 | 50 |
| 400 | 80 | 69 | 73 |
| Untreated (control) | 0 | 0 | 0 |

EXAMPLE 21

The following materials:

| | Grams |
|---|---|
| 3-methoxy-1,2-benzisothiazole-1,1-dioxide | 3 |
| Talc | 97 | are mixed and ground together to prepare a dust composition which may be applied at a rate of 3 kg. per 10 acres of paddy field of rice plant.

EXAMPLE 22

The following materials:

| | Grams |
|---|---|
| 3-allyloxy-1,2-benzisothiazole-1,1-dioxide | 4 |
| Nikkol R-2010 (a trade name of a surface-active agent as produced by Nikko Shokai Co., Japan an octylphenol-formaldehyde resin in the form of a pale yellow oily liquid) | 5 |
| Acetone | 91 | are mixed together to give a composition which may be diluted with water to a volume of about 100-400 times the original volume for spraying.

EXAMPLE 23

The following materials:

| | Grams |
|---|---|
| 3-allyloxy-6-chloro-1,2-benzisothiazole-1,1-dioxide | 4 |
| Nikkol R-2010 | 5 |
| Acetone | 91 | are mixed to give a composition which may be diluted with water to a volume of 100-400 times the original volume for spraying.

EXAMPLE 24

The following materials:

| | Grams |
|---|---|
| 3-(1-ethynyl-allyloxy)-1,2-benzisothiazole-1,1-dioxide | 3 |
| Talc | 97 | are mixed and ground together to prepare a dust which may be applied at a rate of 3 kg. per 10 acres of paddy field of rice plant.

EXAMPLE 25

The following materials:

| | Grams |
|---|---|
| 3-(2-propynyloxy)-1,2-benzisothiazole-1,1-dioxide | 3 |
| Talc | 97 | are mixed and ground together to give a dust which may be applied at a rate of 3 kg. per 10 acres of paddy field of rice plant.

EXAMPLE 26

The following materials:

| | Grams |
|---|---|
| 3-(2-propynyloxy)-1,2-benzisothiazole-1,1-dioxide | 4 |
| Nikkol R-2010 | 5 |
| Dioxane | 91 | are mixed to give a composition which may be diluted with water to a volume of 100-400 times the original volume for spraying.

What we claim is:

1. A method for controlling bacterial and fungal diseases of rice plant which comprises applying to at least a part of the rice plant an effective amount of a 3-substituted-1,2-benzisothiazole-1,1-dioxide of the formula:

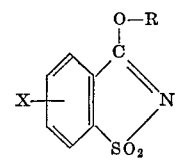

wherein R is selected from the group consisting of $C_1$-$C_7$ and $C_{11}$ alkyl, allyl, 1-ethynyl-allyl, 2-propynyl, 1-ethyl-2-propynyl, 1-n-pentyl-2-propynyl, 3-iodo-2-propynyl, 3-bromo-2-propynl and 2-pentene-4-ynyl; and X is selected from the group consisting of hydrogen, 5-chloro, 6-chloro and 6-nitro.

2. A method as claimed in claim 1 in which an effective amount of 3-methoxy-1,2-benzisothiazole-1,1-dioxide is applied to the rice plant.

3. A method as claimed in claim 1 in which an effective amount of 3-n-hexyloxy-1,2-benzisothiazole-1,1-dioxide is applied to the rice plant.

4. A method as claimed in claim 1 in which an effective amount of 3-allyloxy-1,2-benzisothiazole-1,1-dioxide is applied to the rice plant.

5. A method as claimed in claim 1 in which an effective amount of 3-(2-propynyloxy)-1,2-benzisothiazole-1,1-dioxide is applied to the rice plant.

6. A method as claimed in claim 1 in which an effective amount of 3-(3-iodo-2-propynyloxy)-1,2-benzisothiazole-1,1-doxide is applied to the rice plant.

References Cited

Journal of the American Chemical Society, vol. 65, pp. 457–58, March, 1943.

Chemical Astracts, vol. 37, p. 2360, 1943.

Chemical Abstracts, vol. 47, p. 12128, 1953.

ALBERT T. MEYERS, Primary Examiner

D. J. FUNDERBURK, Assistant Examiner

U.S. Cl. X.R.

260—301